(12) United States Patent
Ochiai (10) Patent No.: US 7,820,056 B2
(45) Date of Patent: Oct. 26, 2010

(54) METHOD OF FLOCCULATING SEDIMENTATION TREATMENT

(76) Inventor: Hisaaki Ochiai, 1-48-2, Narita-Higashi, Suginami-ku, Tokyo (JP)

(*) Notice: Subject to any disclaimer, the term of this patent is extended or adjusted under 35 U.S.C. 154(b) by 0 days.

(21) Appl. No.: 12/600,250

(22) PCT Filed: Jul. 15, 2008

(86) PCT No.: PCT/JP2008/063095

§ 371 (c)(1),
(2), (4) Date: Nov. 13, 2009

(87) PCT Pub. No.: WO2009/025141

PCT Pub. Date: Feb. 26, 2009

(65) Prior Publication Data

US 2010/0133199 A1 Jun. 3, 2010

(30) Foreign Application Priority Data

Aug. 17, 2007 (JP) ............................. 2007-213186
Nov. 21, 2007 (JP) ............................. 2007-301345
Jun. 18, 2008 (JP) ............................. 2008-158743

(51) Int. Cl.
*C02F 1/52* (2006.01)

(52) U.S. Cl. ........................ 210/709; 210/715; 210/726; 210/738; 210/740; 210/802

(58) Field of Classification Search .................. 210/709
See application file for complete search history.

(56) References Cited

U.S. PATENT DOCUMENTS 2,382,490 A * 8/1945 Lawlor ........................ 210/715

(Continued)

FOREIGN PATENT DOCUMENTS

JP 49-28375 B1 7/1974

(Continued)

OTHER PUBLICATIONS

Norihiro Tanbo, Basic Research on Coagulation System in Water (1) to (4), Journal of Japan Industrial Water Association, 1964, No. 361, 363, 365, 367.

(Continued)

*Primary Examiner*—Peter A Hruskoci
(74) *Attorney, Agent, or Firm*—Richard M. Goldberg (57) ABSTRACT

A coagulation sedimentation process for water to be treated in which an inorganic coagulant used in a purified water treatment system is limited, and remaining micro flocks and flocks are made greater in density and finer in particle size, thus obtaining clear water better in quality and reducing the amount of sludge production, including a micro flocculation step for micro-flocculating in advance fine suspended particles in water to be treated, a flocculation step for the micro flocks, and a sedimentation separation step for the flocks, in which as a final stage of the flocculation step, a flock-forming inclined plate whose pitch width is from 5 mm or more to 50 mm or less is provided, and an inorganic coagulant is limited so that the turbidity of the water to be treated after passage of the inclined plate at a ratio to that before passage is 4/5 or less.

18 Claims, 3 Drawing Sheets

U.S. PATENT DOCUMENTS

| | | | | |
|---|---|---|---|---|
| 4,055,494 | A | * | 10/1977 | Emmett, Jr. ............... 210/715 |
| 4,388,195 | A | * | 6/1983 | von Hagel et al. .......... 210/709 |
| 5,143,625 | A | * | 9/1992 | Ballard ....................... 210/713 |
| 5,382,356 | A | * | 1/1995 | Thogho et al. ............. 210/96.1 |
| 5,433,853 | A | * | 7/1995 | Mamone .................... 210/615 |
| 5,900,154 | A | * | 5/1999 | Henriksen .................. 210/703 |
| 6,428,698 | B1 | * | 8/2002 | Ochiai et al. ............... 210/202 |
| 6,565,755 | B1 | * | 5/2003 | Holdsworth ................ 210/709 |
| 7,527,726 | B2 | * | 5/2009 | Slough et al. .............. 210/96.1 |

FOREIGN PATENT DOCUMENTS

| | | |
|---|---|---|
| JP | 51-123961 A | 10/1976 |
| JP | 6-304411 A | 11/1994 |
| JP | 2001-120909 A | 5/2001 |
| JP | 2004-141773 A | 5/2004 |
| JP | 2006-715 A | 1/2006 |
| JP | 2007-203133 A | 8/2007 |

OTHER PUBLICATIONS

Committee Report: Capacity and Loadings of Suspended Solids Contact Units, J. Awwa, Apr. 1951.

Shogo Thunoda and Katsuyuki Kataoka, Research on Slurry Blanket-Type Rapid Coagulation Sedimentation Plant (2), Effects of Coagulation and Agitation Conditions on Slurry Blanket Layer, Journal of Japan Industrial Water Association, 1969, No. 133, pp. 39-47.

Design Guide of Water Works, Japan Water Works Association, 2000.

* cited by examiner

METHOD OF FLOCCULATING SEDIMENTATION TREATMENT

TECHNICAL FIELD

The present invention relates to a coagulation sedimentation process for water to be treated in which an inorganic coagulant is injected into water to be treated such as river water, rain water and water discharged from plants, through a micro flocculation step for agglomerating fine suspended particles contained in the water to be treated to form micro flocks and a flocculation step for flocculating the micro flocks by being brought into contact with existing flocks, thereby the flocks formed in these flocculation steps are settled and separated at a sedimentation basin to obtain sedimentation-treated water.

BACKGROUND ART

Coagulation and sedimentation of water to be treated have been adopted as a prior treatment of sand filtration. In the present coagulation sedimentation process, an inorganic coagulant is injected into water to be treated to agglomerate fine suspended particles contained in the water to be treated into a flock having a diameter that can be settled and separated, thus conducting sedimentation and separation of the flock by the action of gravity.

A coagulation sedimentation plant is roughly categorized into a conventional system and a rapid coagulation sedimentation basin system, and the latter is further categorized into a slurry circulating system and a sludge blanket system. There is, however, no difference between these systems in that they are involved in sedimentation and separation through a micro flocculation step of suspended particles and a flocculation step of micro flocks.

Then, the search for types and amounts of coagulants and coagulant aids necessary for forming a flock having a greater diameter has been a major technical challenge in a conventional coagulation sedimentation process.

An existing coagulation sedimentation process has been based on the following general equation proposed by Smoluchowski.

$$dN/dt = \alpha \beta n_i n_j \qquad [\text{Equation 1}]$$

Wherein N stands for the number of fine suspended particles and micro flocks in unit volume; $\alpha$, collision efficiency which stands for deposit efficiency when two particles collide, and will vary depending on an inorganic coagulant; $\beta$, collision frequency of two particles; $n_i$, the number of particles which will flow per unit volume; and $n_j$, the number of existing particles in unit volume.

In addition, $dN/dt$ expressed by the above general equation indicates a speed of reducing fine suspended particles and micro flocks per unit time, which is referred to as flock forming speed.

Incidentally, a coagulation theory based on the above described Smoluchowski equation has been explained in such a way that, for example, as disclosed in Non-Patent Document 1, a conventional process is used to divide a step of agglomeration into two steps, more specifically a micro flocculation step for neutralizing the charge of fine suspended particles contained in water to be treated and agglomerating these suspended particles into micro flocks whose diameter is approximately 3.0 μm, is dependent on Brownian motion, and a flocculation step for agglomerating the micro flocks whose diameter is 3.0 μm or greater into flocks which can be settled and separated is dependent on whether or not agitation is conducted by force of agitation greater than a predetermined level.

However, on the other hand, Non-Patent Document 2 has reported that flocks will be destroyed on agitation conducted strongly and rapidly. Further, due to influences of an explanation that the flocks are destroyed by shearing force which deteriorates the flock surface, slow agitation relatively lower in agitation intensity has been adopted in a flock forming step.

In reality, rapid coagulation sedimentation basins have been mostly developed in the U.S.A. However, as described above, agitation by water streams lower in agitation intensity has been adopted in a micro flocculation step due to the influence of Non-Patent Document 2.

On the other hand, as shown in Non-Patent Document 3, the Smoluchowski equation has indicated that an increase in collision frequency $\beta$, that is, an increase in agitation intensity, is effective in agglomeration. An experiment has been done by using, for example, a sludge blanket-type rapid coagulation sedimentation basin to increase the agitation intensity rapidly. However, a conclusion was reached in the above experiment that where a strong agitation is kept for a prolonged period of time in a micro flocculation step, that is, where a $G_R$ value which is rapid agitation intensity and a $T_R$ value which is rapid agitation time are increased, a original flock is destroyed to increase the turbidity of sedimentation-treated water, which is the same as that reported in conventional experiments. As a result, the above-described rapid agitation system is rarely adopted.

As described above, in response to a request so far made for improving the quality of filtered water, on coagulation and sedimentation which are prior treatments, an operation heavily depending on an increased injection rate of inorganic coagulants on the precondition to accelerate the agglomeration of suspended particles and suppress the destruction of flocks has been adopted. In particular, in the operation of a rapid coagulation sedimentation basin where no rapid agitation is conducted, an injection rate of inorganic coagulants is increased to such an extent that there is no room left for immediate improvements.

However, the above-described operation heavily depending on the increased injection rate of inorganic coagulants is able to provide results which are substantially satisfactory in terms of sedimentation but raises other technical problems at the stage of filtration and sludge disposal which are subsequent to the sedimentation.

More specifically, with an increase in the injection rate of inorganic coagulants, micro flocks which flow into a filtration basin are made coarse and lower in density as well as flocculates and agglomerates in sedimentation-treated water are increased in residual amount due to an increased volume of the flocks. As a result, there is posed a problem that the filtration basin must be washed more frequently.

Further, regarding the sludge disposal, sludge in itself is developed in an increased amount with an increased amount of inorganic coagulants and the sludge is reduced in concentration and dehydration, thus making the sludge disposal difficult.

A fundamental cause behind the problems on the above-described conventional technologies is that despite the fact that coagulation, sedimentation, filtration and sludge disposal are operated as an integrated system, the operation has been adopted for the system by giving substantially no consideration to optimal filtration or sludge disposal but only emphasizing the formation of flocks having a greater diameter for optimizing the sedimentation, more specifically, with concern for an increased turbidity of sedimentation-treated water in association with destruction of flocks, there has been selected an agglomeration process which is extremely ineffective and lower in agitation intensity and no attention has been given to the realization of high-quality filtration which is a subsequent treatment.

With the above situation taken into account, Patent Document 1 has made such a proposal that there are provided rapid agitation tanks made up with plural stages, a lower limit of agitation intensity is set in a first tank, while an upper limit of agitation intensity is set in a second tank and subsequent tanks, and an inorganic coagulant is injected in a divided manner to each of the rapid agitation tanks, thereby improving the efficiency of particle separation and reducing the concentration of remaining inorganic coagulants (refer to claim 6 and a description related to claim 6).

However, in the above constitution proposed in Patent Document 1, the above effects are obtained insufficiently in that the second and subsequent tanks are limited in agitation intensity more than necessary. Further, an inorganic coagulant is not necessarily adjusted for injection as a whole or criteria for the adjustment are not established. Thus, there is no chance of avoiding such an assessment that the above effects are attained quite insufficiently.

Patent Document 2 has described a process that a hollow contact layer can be arranged to separate micro flocks which are finer in particle size and higher in density. However, the contact layer is needed for washing due to the fact that the layer is clogged more extensively according to retention of the micro flocks, by which the layer is not usable in a sedimentation treatment which is premised on continuous treatment.

More specifically, formation of the micro flocks finer in particle size and higher in density may be partially able to reduce the concentration of remaining inorganic coagulants but unable to satisfy a fundamental technical request for continuous treatment. Thus, there is no chance of avoiding such an assessment that the above process is fatally defective as a coagulation sedimentation process for water to be treated.

Non-Patent Document 4 has described that in place of a conventional coagulation process lower in agitation intensity and higher in injection rate of inorganic coagulants in which flocks will easily leak from a sand layer, it is preferable to adopt a coagulation process higher in agitation intensity and lower in injection rate of inorganic coagulants. However, flocks formed by this coagulation process are made finer in particle size and higher in density, thereby micro flocks remain abundantly in sedimentation-treated water. Nevertheless, since a specific constitution for separating these micro flocks is not indicated at all, there is no chance of avoiding such an assessment that this process is incomplete technically.

Apart from the assessment of individual known technical documents, in coagulation and sedimentation for water to be treated, at a final stage of flocculation or at the final stage thereof or an intermediate stage, a flock-forming inclined plate is provided to contribute to the flocculation of micro flocks. However, the inclined plate is considered to contribute to the flocculation functions only to a supplementary extent. In reality, there has been so far proposed or suggested no technical idea for positively utilizing flocculation functions which are given originally to the flock-forming inclined plate.

Non-Patent Document 4 has actually described the inclined plate but has not disclosed or suggested the above technical idea at all.

[Patent Document 1] Japanese Published Unexamined Patent Application No. 2007-203133

[Patent Document 2] Japanese Published Unexamined Patent Application No. H06-304411

[Non-Patent Document 1] Norihiro Tanbo: Basic Research on Coagulation System in Water Treatment (1) to (4), Journal of Japan Industrial Water Association, No. 361, 363, 365, and 367 (1964. 10, 1964. 12, 1965. 2, 1965. 4)

[Non-Patent Document 2] Committee Report: Capacity and Loadings of Suspended Solids Contact Units, J. AWWA, April 1951

[Non-Patent Document 3] Shogo Thunoda and Katsuyuki Kataoka): Research on Slurry Blanket-Type Rapid Coagulation Sedimentation Plant (2), Effects of Coagulation and Agitation Conditions on Slurry Blanket Layer, Journal of Japan Industrial Water Association, No. 133, pp 39-47, 1969, 10

[Non-Patent Document 4] Design Guide of Water Works, the Japan Water Works Association, issued in 2000.

DISCLOSURE OF THE INVENTION

In view of the above-described conventional technologies, an object of the present invention is to provide a coagulation sedimentation process for water to be treated in which for optimization of a whole purified water treatment system including filtration and sludge disposal which are subsequent treatments, flocculation functions which are originally given to a flock-forming inclined plate are positively utilized as a coagulation sedimentation process to accelerate the flocculation and also for exhibiting these functions of the flock-forming inclined plate, an inorganic coagulant is used in a more limited manner than that used in conventional technologies to make remaining micro flocks and flocks higher in density and finer in particle size, thus making it possible to obtain purified water better in quality and also to reduce the amount of sludge production.

In order to attain the above object, a basic constitution of the present invention is a coagulation sedimentation process for water to be treated which has an inorganic coagulant injection step for injecting an inorganic coagulant into water to be treated, a micro flocculation step for mixing and agitating the water to be treated into which the inorganic coagulant is injected in a rapid agitation tank to attain in advance micro-flocculation of fine suspended particles in the water to be treated, a flocculation step including a step in which the micro flocks are further flocculated by being brought into contact with existing flocks in a sedimentation basin, and a sedimentation separation step for effecting the sedimentation and separation of the flocks in the sedimentation basin, in which as a final stage of the flocculation step, a flock-forming inclined plate whose pitch width is from 5 mm or more to 50 mm or less is provided and also an inorganic coagulant at a stage after the micro flocculation step is used in a limited manner so that the turbidity of water to be treated after passage of the inclined plate is 4/5 or less than the turbidity before passage of the inclined plate.

BRIEF DESCRIPTION OF THE DRAWINGS

FIG. 5 is a cross sectional view showing a situation in which, water to be treated forms swirling currents near the lower end of the flock-forming inclined plate between the inclined plates, moving upward, while forming turbulent currents thereafter.

EFFECTS OF THE INVENTION

In the present invention which is related to the above-described basic constitution, the flock-forming inclined plate is allowed to exhibit flock forming functions so that the turbidity of water to be treated after passage through the flock-forming inclined plate can be 4/5 or less as compared with the turbidity before the passage, and the functions are attained not only by setting a pitch width to be simply from 5 mm to 50 mm but also by limiting an amount of inorganic coagulants used in the micro flocculation step. As a result, micro flocks remaining in clear water are finer in particle size and higher in density than those in a conventional technology, thus making it possible to provide clear water better in quality. It is also possible to reduce the amount of sludge production associated with the use of an inorganic coagulant and also dispose of sludge in a less troublesome manner due to a reduced amount of the sludge.

BEST MODE FOR CARRYING OUT THE INVENTION

A description will be first given to a principle of the basic constitution.

In the present invention, with attention paid to flock forming functions of a flock-forming inclined plate 8, importance is also given to these functions. As shown FIG. 5, flock forming functions of the inclined plate 8 are such that at a stage that water to be treated 1 advances into a lower-side end portion of the flock-forming inclined plate 8, swirling currents are created, and turbulent currents are formed at a region upward from the lower-side end portion inside the flock-forming inclined plate 8 due to the swirling currents.

There is an increase in the probability or frequency that micro flocks and suspended particles which have not settled in a sedimentation basin 21 will collide with each other due to the above-described swirling currents and turbulent currents, thereby accelerating flocculation.

In the present invention, the flock-forming inclined plate 8 is limited in pitch to a range of 5 mm to 50 mm.

Grounds for the above limitation will be described. That is, the pitch is quite small, and where it is less than 5 mm, with the passage speed of water to be treated 1 taken into account, a laminar current will develop more easily inside the flock-forming inclined plate 8, for which a lower limit is set to be 5 mm. On the other hand, where the pitch is quite large and in excess of 50 mm, the swirling current and the turbulent current are reduced in proportion of an entire water current, for which an upper limit is set to be 50 mm, as described previously.

As described in the basic constitution, in order for the flock-forming inclined plate 8 to exhibit flocculation functions so that the turbidity is 1/2 or less before and after the passage through the flock-forming inclined plate 8, flocculation is not necessarily obtained only by setting the pitch width to be from 5 mm to 50 mm.

More specifically, in the sedimentation basin 21, at a stage prior to the flock-forming inclined plate 8, particles which are flocculated by collision between micro flocks or collision of the micro flocks with existing flocks are reduced in proportion, while micro flocks advancing into the flock-forming inclined plate 8 or suspended particles which do not undergo micro flocculation are increased in proportion, and there is a necessity that the flocks are flocculated by mutual collision in the inclined plate 8 to fall from the inclined plate 8 and settled inside the sedimentation basin 21. Thus, an inorganic coagulant used in a micro flocculation step must be consequently limited to an amount lower than a predetermined amount.

This is because flocculation has already made progress to a stage prior to advancement into the flock-forming inclined plate 8 in the sedimentation basin 21 when the inorganic coagulant is used in a greater amount in the micro flocculation step, thus resulting in a reduced proportion of micro flocks advancing into the flock-forming inclined plate 8 and suspended particles which do not undergo micro flocculation, and flocculation is less frequently caused in the inclined plate 8.

In giving a new description to the principle of the present invention according to the Smoluchowski equation described in the Section of Prior Art, this equation may be expressed differently as shown below.

$$dN/dt = -\alpha(4G\Phi/\pi) \cdot N \quad \text{[Equation 2]}$$

wherein N stands for the number of particles (micro flocks or flocks) per unit volume; $\alpha$, collision efficiency based on influences of inorganic coagulant; G, speed gradient; and $\Phi$, mean volume of particles (micro flocks or flocks) per unit volume.

A general solution of the above elementary differential equation can be expressed as $N = A\exp(-kt)$ (however, provided that A stands for the number of particles (micro flocks or flocks) per unit volume at a stage of $t=0$ and $k=\alpha(4G\Phi/\pi)$).

At a stage where micro flocculation is completed, as described in the present invention, a general solution for limiting the use of an inorganic coagulant is given as $N_a$, and as in a conventional technology, a general solution for using an inorganic coagulant in a greater amount than the limited use is given as $N'_a$, $\alpha$, which is a collision efficiency based on the influence of an inorganic coagulant, and $\Phi$, which is a mean volume of flocks or micro flocks per unit volume, have a relationship of $N_a > N'_a$ as long as $\Phi'$a corresponding to $N'_a$ is greater than $\Phi$a corresponding to $N_a$.

On the other hand, at a stage that water to be treated 1 advances into a sedimentation basin 21 and passes through a flock-forming inclined plate 8, as described in the present invention, an inorganic coagulant is used in a limited amount and the flock-forming inclined plate 8 is set for the pitch to be small, which is only to make the speed gradient G greater because swirling currents and turbulent currents are more likely to take place inside the inclined plate 8.

More specifically, in the present invention, as compared with a conventional technology, although $\alpha$, collision efficiency, and $\Phi$, mean volume, are set to be smaller, G, speed gradient, is set to be greater at a stage that flocks flow from the flock-forming inclined plate 8. Thus, at a stage of completion of the micro flocculation, even if there is obtained a relationship of $N_a > N'_a$ on the basis of a magnitude relationship of $\alpha$, $\Phi$ and G, at a stage that flocks pass through the flock-forming inclined plate 8, where a general solution for adopting the flock-forming inclined plate 8 based on the pitch described in the present invention is given as N and the general solution at a stage that flocks pass through the flock-forming inclined plate 8 as adopted in a conventional technology is given as N', there is obtained a relationship of $N_b \approx N'_b$, in other words, it is possible to provide a state that N, the number of flocks and micro flocks which are finally formed in the sedimentation basin 21 is approximately equal to the number of them obtained in the conventional technology.

However, as described above, even if N, the number of flocks and micro flocks formed in the sedimentation basin 21 is approximately equal, as described in the present invention, where an inorganic coagulant is used in a limited amount to make the flocks and micro flocks greater in intensity, the micro flocks remaining in clear water have an increased frequency to settle, thus making it possible to obtain clear water better in quality and also reduce the amount of sludge production, as so far pointed out.

Micro flocks made greater in density can also be formed by making agitation at a level greater than a predetermined level in a rapid agitation tank 10.

With attention given to actions of the rapid agitation, one embodiment adopts such a constitution that a micro flocculation step is connected in series so that water to be treated 1 can move sequentially in a rapid agitation tank 10 which is divided into two or more compartments, in which provided are a first coagulant injection step for injecting an inorganic coagulant into a whole or a part of the water to be treated 1 at a stage leading to a first compartment in the micro flocculation step and a second coagulant injection step for injecting an inorganic coagulant into a whole or a part of the water to be treated 1 at a stage leading from a second compartment in the micro flocculation step to a flocculation step, and the injection amounts are adjusted respectively in the first coagulant injection step and the second coagulant injection step.

A description will be given to the principle of one embodiment by referring to a general solution based on the Smoluchowski equation. Where an inorganic coagulant is injected only in an amount of V from the beginning (at a stage of t=0) and the micro flocculation step is not divided into two or more compartments unlike the above-described basic constitution, the number of particles $N_{1+2}$ per unit time for mean treatment time for micro flocculation given as $t=t_1+t_2$ can be expressed as $N_{1+2}=A \exp(-k\,t_1-k\,t_2)$.

On the other hand, where a micro flocculation step is divided into two or more compartments, as with the previously described basic constitution and a step of injecting an inorganic coagulant is also divided into a first coagulant injection step and a second coagulant injection step, an injection amount of the former is given as $V-\Delta V$, and that of the latter is given as $\Delta V$ ($\Delta V$ indicates an amount which is smaller at least by one digit than V), further where a mean treatment time for micro flocculation in the first compartment of water to be treated 1 is given as $t_1$ and a mean treatment time for micro flocculation in the second coagulant injection step is given as $t_2$ and still further where the number of particles per unit volume at a final stage of the first coagulant injection step is given as $N_1'$ and the number of particles per unit volume at a final stage of the second coagulant injection step is given as $N'_{1+2}$, there is provided a relationship of $$N_1'=A'\exp(-k_1 t_1)$$

(however, provided that A' stands for $N_1'$ at a stage of t=0, that is, the number of micro flocks or $k_1=\alpha_1(4G\Phi/\pi)$, and $\alpha_1$ stands for a coagulation efficiency corresponding to injection of inorganic coagulant only by $V-\Delta V$ per unit volume) and a relationship of $$N'_{1+2}=N_1'\exp(-k_2 t_2)=A'\exp(-k_1 t_1-k_2 t_2)$$

(however, provided that A' stands for $N_1'$ at a stage of t=0, that is, the number of micro flocks or $k_2=\alpha_2(4G\Phi/\pi)$, $\alpha_2$ stands for a coagulation efficiency corresponding to injection of inorganic coagulant only by $\Delta V$ in the second coagulant injection step, and $\Phi'$ stands for a mean flock volume at a stage that water to be treated 1 flows from the first compartment to the second compartment).

In view of a magnitude relationship between above-described $N_{1+2}$ and $N'_{1+2}$, for a predetermined time from an initial time (time to $t=t_1$), as a matter of course, micro flocks existing in the water to be treated 1 will coagulate under the influence of an inorganic coagulant. It should be noted that all of the thus injected inorganic coagulant is not necessarily involved in micro flocculation but the inorganic coagulant exhibits coagulation action, while being sequentially absorbed into the micro flocks.

In this case, where an amount of the initially injected inorganic coagulant per unit volume is V or $V-\Delta V$ (however, provided that $\Delta V$ indicates an amount which is smaller by one digit than V), there is hardly found a difference in influence on the coagulation action.

Therefore, a relationship of a $\alpha \approx \alpha_1$ is obtained between $\alpha$ and $\alpha_1$ which are the respective elements of the above-described k and $k_1$. Thus, there is also obtained a relationship of $k \approx k_1$.

On the basis of the same grounds, there are obtained relationships of $\alpha \approx \alpha_2$ and $A \approx A'$.

However, as long as a mean volume of micro flocks is reduced due to rapid agitation in the first compartment at a stage leading to the second compartment, there is obtained a relationship of $\Phi' < \Phi$.

Since a relationship of $a_2 < a$ is obtained, there are at last obtained relationships of a $(t_1+t_2) > a_1 t_1 + a_2 t_2$ and $N'_{1+2} > N_{1+2}$. More specifically, where an inorganic coagulant is injected in the same amount per unit volume not to provide and to provide a first compartment and a second and subsequent compartments, coagulation takes place in the latter case to increase in the number of particles to be removed, finally making it possible to conduct coagulation efficiently.

Therefore, as described in one embodiment, where the rapid agitation tank 10 is divided into two or more compartments and an inorganic coagulant is refilled in the second and subsequent compartments, an inorganic coagulant is admixed in a smaller amount as a whole, thus making it possible to secure similar coagulation effects, that is, the number of coagulation particles per similar unit volume.

Figure 1:
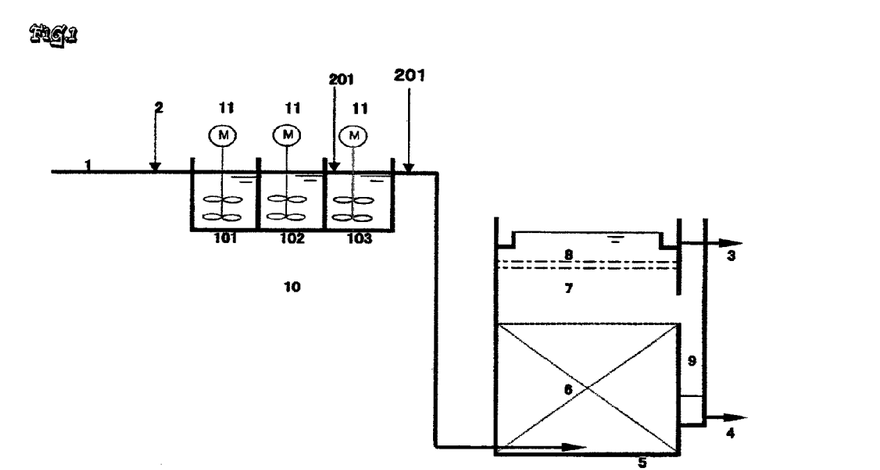
FIG. 1 is a block diagram showing a basic idea of the present invention when a sludge blanket system is adopted.

In the embodiment shown in FIG. 1, there is adopted a rapid agitation tank 10 divided into two or more compartments (it is noted that FIG. 1 shows a rapid agitation tank 10 divided into three compartments 101, 102, 103). The rapid agitation tank 10 is adopted, by which particles that will settle in a sedimentation basin 21 and particles that will not settle but will remain in sedimentation-treated water 3 are minimized in mean particle size and, therefore, particles to be filtrated at a stage of filtration of the sedimentation-treated water 3 are minimized in particle size. As a result, it is possible to minimize remaining micro flocks.

Further, in this embodiment, the amount of the inorganic coagulant to be admixed is adjusted (limited) in each of the first coagulant injection step and the second coagulant injection step so that the remaining amount of coagulants and agglomerates is less than a predetermined level. Therefore, while particles bond to each other less frequently via an inorganic coagulant as described in a conventional technology to make micro flocks greater in density, the amount of sludge in itself produced in association with the thus used inorganic coagulant is reduced to improve the concentration and dehydration of the sludge, thus making it easier to dispose the sludge.

As shown in FIG. 1, a second coagulant injection position 201 may be adopted not only at a stage of the rapid agitation tank 10 subsequent to the second compartment 102 and thereafter but also at a stage after completion of agitation in the rapid agitation tank 10 but prior to a flocculation step.

Another embodiment is such that as an index for indicating a remaining amount of coagulants and agglomerates an STR (Suction Time Ratio: an index indicated by Ts/Tv where distilled water equal in temperature and volume with water to be treated 1 is used to suck the same filter paper at the same suction level and where the suction time of the water to be treated 1 is given as Ts and that of the distilled water is given as Tv) of water to be treated at a stage that the micro flocculation step is completed is 4.0 or lower and preferably 2.5 or lower.

More specifically, in reality, as the use of an inorganic coagulant in such a manner that a remaining amount of coagulants and agglomerates of the inorganic coagulant is less than a predetermined level, which is a feature of the basic constitution, an embodiment which adopts the STR is favorable and also in an easily usable state.

The STR is defined in an easily understandable manner. In a strict sense, it is defined by a ratio of STR=Ts/Tv where specimen water, 500 mL, and distilled water equal in temperature and volume are sucked at the respective time of Ts (sec) and Tv (sec) by using a suction device (specifically, a device equipped with a reduced pressure vessel, a filter holder and a suction pump with a vacuum level of 26.7 kPa) to which attached is a membrane filter (total thickness of 45 mm) (a filter made by Advantec Inc. having a mean pore size of 0.45 μm and porosity of 38%).

However, this embodiment is able to adjust well to the (limit) amount of used inorganic coagulant which is related to the basic constitution not by using the strictly defined STR but by using the STR.

As described in this embodiment, where an injection amount is adjusted (limited) in the first coagulant injection step and in the second coagulant injection step so as to give the STR of 4.0 or less, it is possible to reduce the amount of fine suspended particles contained in water to be treated 1 and also reduce the destruction of flocks. Flock-forming inclined plates 8 mounted at a pitch of 5 mm to 10 mm in a clarification zone 7 of a part for taking out sedimentation-treated water 3 in a sedimentation basin are used to reduce the amount of micro flocks flowing out from the sedimentation basin 21, thereby an inorganic coagulant can be injected at a rate lower than a conventional method to obtain sedimentation-treated water 3 lower in turbidity.

In particular, where the inorganic coagulant is adjusted for the injection rate so as to give an STR of 2.5 or less at the beginning of a flocculation step, micro flocks are allowed to grow into large-size micro locks, for example, those with a diameter of 30 μm or more, while reflecting and keeping the property of micro flocks which are finer in particle size and greater in density.

Therefore, the large-size micro flocks are smaller in diameter than conventional flocks but made greater in density to have a greater settling speed, thus making it possible to accelerate the sedimentation and separation of the flocks in the sedimentation basin 21 and also the reduction in turbidity of sedimentation-treated water 3.

Another embodiment is such that after coagulation conditions are set that the number of particles remaining in sedimentation-treated water 3 whose diameter is 3.0 μm or less is 100,000/mL or less and preferably 40,000/mL or less at a stage that a micro flocculation step is completed, in a flocculation step, that is, a stage prior to complete passage through a flock-forming inclined plate 8, flocculation is conducted under such coagulation conditions that an SDI value or an index indicating the concentration performance of flocks (an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using a 100 mL-capacity measuring cylinder) is 6 mg/mL or more, preferably 8 mg/mL or more.

This embodiment requires such coagulation conditions that the number of particles with a diameter of 3.0 μm or less remaining in the sedimentation basin 21 is 100,000/mL or less, preferably 40,000/mL or less. There is originally found a relationship that the greater the amount of inorganic coagulants, the fewer the number of micro flocks per unit volume.

However, as apparent from the previously described basic constitution, since an inorganic coagulant used in the micro flocculation step is limited, it is impossible to secure numerical requirements of the micro flocks per unit volume.

Nevertheless, the numerical requirements have been met, which is only due to the fact that in this embodiment, rapid agitation is set to be greater in its extent on the basis of the previous embodiment.

On the other hand, in this embodiment, as described previously, at a stage prior to completion of passage through the flock-forming inclined plate 8, an SDI value is required to be 6 mg/mL or more and preferably 8 mg/mL or more.

The requirements of these SDI values have been met, which means that, as described above, the rapid agitation is set to be greater in its extent, thereby micro flocks advancing into the sedimentation basin 21 are made greater in density, collide with each other and also easily undergo sedimentation on coagulation.

As described above, in this embodiment, the rapid agitation is set to be greater in its extent, by which micro flocks are made greater in density. Therefore, after the micro flocks collide with each other to effect flocculation on a flock-forming inclined plate 8, they fall from the inclined plate 8 to settle quite easily in the sedimentation basin 21. Thus, there is developed a state that may satisfy relatively easily such a requirement that the turbidity of water to be treated 1 after passage through the flock-forming inclined plate 8 at a ratio to before the passage is reduced to 4/5 or less.

Among various systems described in the Section of Background Art, a sludge blanket system and a conventional system are mainly adopted in systems of the sedimentation basin 21 for effecting flocculation.

As described in another embodiment, as a matter of course, the above two systems are constituted so that, a flock-forming inclined plate 8 is provided only in the vicinity of an outlet port of the sedimentation basin 21 from which clear water flows.

Figure 3:
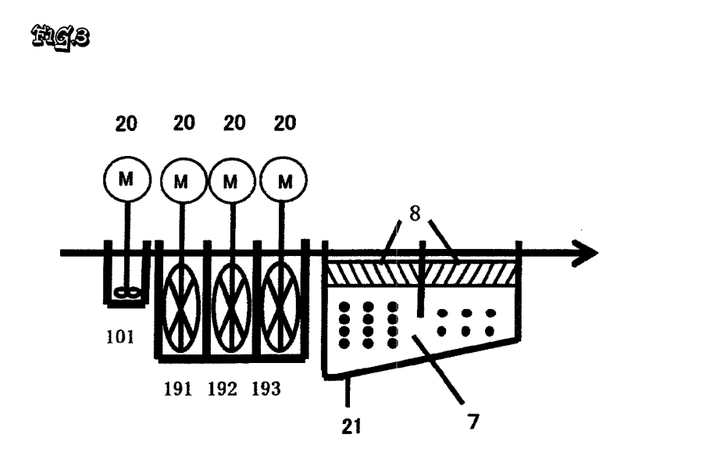
FIG. 3 is a block diagram showing an embodiment in which a slow agitation tank is adopted on the basis of a conventional system and inclined plates for flock formation are provided at two stages, that is, near an inlet port and an outlet port of a sedimentation basin 21.

However, in the conventional system, as described in a further embodiment, the conventional system is adopted as a flocculation step and, as shown in FIG. 3, such a system can be adopted that the flock-forming inclined plate 8 is mounted at two places, that is, in the vicinity of an inlet port of the sedimentation basin 21 subsequent to slow agitation tanks 191, 192 and 193 into which water to be treated 1 flows and in the vicinity of an outlet port thereof from which clear water flows.

As described above, where the flock-forming inclined plate 8 is provided at two places or the inlet port and the outlet port, the flock-forming inclined plate 8 near the inlet port exhibits quite remarkable flocculation functions, which will be described in a second embodiment.

Another embodiment is such that the micro flocculation step is divided into two or more compartments, and as a rapid agitation intensity in each compartment, a $G_R$ value (a value expressed by [Equation 3]

$$G_R = \sqrt{\frac{(CAv^3)}{2\gamma V}}$$

where an agitation coefficient is given as C, an area of agitation blade is given as A (m²), a peripheral speed of agitation blade is given as v (m/sec), a coefficient of kinetic viscosity is given as Y(m²/sec) and a volume of agitation tank (capacity) is given as V (m³)) is 150 sec⁻¹ or more, and, as rapid agitation time, a T value is set to be 3 minutes or more.

In general, at each of the compartments where rapid agitation is conducted, an agitation intensity $G_R$ is made greater and agitation time T is also made longer, thus making it possible to reduce the number of fine suspended particles and make micro flocks greater in density. In this instance, coagulants and agglomerates are consumed while contributing to adhesion on collision of suspended particles with micro flocks, thereby reducing an STR. However, where such a high rate of coagulant injection is adopted that after rapid agitation, the STR exceeds a predetermined value and an inorganic coagulant remains abundant, the coagulants and agglomerates are inevitably made course in particle size and lower in density in a subsequent flocculation step. Thus, micro flocks which have been once made finer in particle size and higher in density by rapid agitation are inevitably made coarse in particle size and also lower in density.

Therefore, as described in a previous embodiment, an STR of water to be treated at a stage that a micro flocculation step is completed is 4.0 or less, preferably 2.5 or less, and more preferably the value is brought closer to 1.0 as much as possible. Thereby, flocks are prevented from being made coarse in particle size or lower in density in a subsequent flocculation step, thus making it possible to attain efficiently an object of the present invention.

More specifically, in order to realize the STR based on the previously described numerical requirements, a coagulant is injected in a smaller amount than a conventional technology to make micro flocks greater in density, thus making it possible to settle and separate the micro flocks efficiently and also optimize both the subsequent filtration treatment and sludge disposal.

Another embodiment is such that a vertical width of the flock-forming inclined plate 8 is from 30 mm or more to 100 mm or less and a plurality of the inclined plates are mounted at an interval of 20 mm or more to 200 mm or less in the vertical direction.

As described in the above embodiment, where the vertical width of the flock-forming inclined plate 8 is set to be 30 mm or more, turbulent currents can be formed at many places to contribute to flocculation.

However, in view of the fact that the vertical width in excess of 100 mm will not contribute to the formation of turbulent currents, an upper limit of the vertical width is set to be 100 mm, as described above.

A reason for providing a plurality of the flock-forming inclined plates 8 is based on the fact that swirling currents can be formed near the lower end of each of the inclined plates to accelerate an efficient flocculation.

Then, a reason why an interval of 20 mm or more is needed for each of the inclined plates is that in a normal flowing state of water to be treated 1, a fluid state at the lower ends of the flock-forming inclined plates 8 mounted at an interval is 20 mm or less is in a fluid state resembling a continuous state found between these inclined plates 8. Therefore, swirling currents are less likely to develop at the lower end of an upstream flock-forming inclined plate 8, based on which the lower limit is set. Further, an interval exceeding 200 mm is not technically significant, based on which the upper limit is set.

In most cases, an angle of the flock-forming inclined plate 8 with respect to a horizontal direction is set to be from 30° to 80°.

Figure 2:
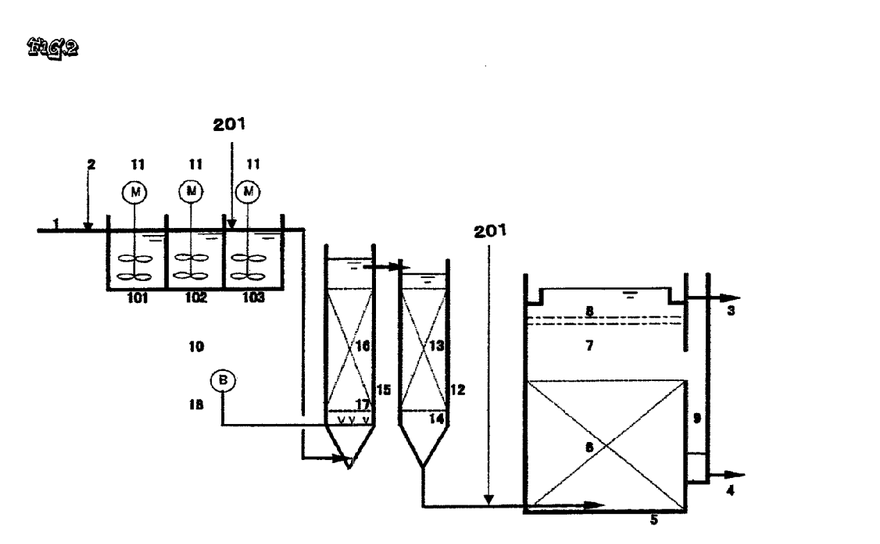
FIG. 2 is a block diagram showing an embodiment having a contact-media accumulation tank where the sludge blanket system is adopted.

As shown in FIG. 2, another embodiment is such that there are provided contact-media accumulation tanks 12, 15 in which a state for blocking the flow of micro flocks is formed between a rapid agitation step and a flocculation step to enable the contact of newly flown micro flocks with existing micro flocks and the collision thereof, and water to be treated 1 passes through the contact-media accumulation tanks 12, 15, by which micro flocculation is further accelerated.

As described previously, a hollow cylinder that forms swirling currents to retain micro flocks is often adopted as a typical and specific shape of contact-media accumulation layers 13, 16 for blocking the flow of micro flocks against flowing water. In FIG. 2, a single or a plurality of contact-media accumulation tanks 12, 15 (two tanks in FIG. 1) in which the contact-media accumulation layers 13, 16 are arranged as described previously are provided between a rapid agitation tank 10 divided into three compartments 101, 102, 103 and a sludge blanket tank 5 for realizing a flocculation step.

These contact-media accumulation tanks 12, 15 are provided, by which a countless number of micro-swirling currents are formed in cavities inside and outside individual contact media in a contact-media accumulation tank. The micro-swirling currents first retain micro flocks in the cavities inside and outside the contact media in an existing flock state and then transport subsequent micro flocks to existing flocks, thus making it possible to realize collision and retention at an extremely high frequency. Effects resulting from the realization of micro flocculation based on the collision and retention are much greater than those resulting from micro flocculation in a rapid agitation tank 10 in which G and T values are increased. Thus, the effects of agglomeration can be increased further in a subsequent flocculation step and consequently micro flocks made finer in particle size and greater in density can be separated more effectively in the sedimentation basin 21. More specifically, since micro flocks flowing into the filtration step can be made finer in particle size and greater in density and the number of particles can be also reduced, it is possible as a whole to reduce at the same time the diameter and the number of micro flocks in water to be treated 1 which has been filtered.

Regarding phenomena involved in the above effects, since a collision frequency, β, is influenced by an amount of the swirling currents to give a greater value in the Smoluchowski equation [0003] (a collision frequency resulting from the swirling currents is much greater than that resulting from turbulent currents by agitation in an agitation tank) and the number of existing flocks, n can be increased, it is possible to make great a reduction rate (dN/dt) of micro flocks per unit volume of water to be treated 1 at a stage from the rapid agitation tank 10 to an outlet port. It is also possible to increase a mean diameter of micro flocks in the water to be treated 1 at a stage from the contact-media accumulation layer to the outlet port and also reduce the number of these micro flocks.

Therefore, where the contact-media accumulation tanks 12, 15 are provided, in order to obtain the same micro-flock forming speed, a lower collision efficiency α, that is, a collision efficiency based on the influence of an inorganic coagulant can be set to be smaller than a case where no tanks are provided. As a result, it is possible to obtain micro flocks greater in density. However, since agitation is reinforced in a rapid agitation tank, an agitation intensity, G and agitation time, T can be set to be smaller.

As shown in FIG. 2, another embodiment is such that a plurality of contact-media accumulation tanks are provided (however, FIG. 2 shows a case where two tanks are installed). Thus, passage of the water to be treated 1 through a plurality of the contact-media accumulation tanks 12, 15 makes it possible to further accelerate the micro flocculation greater in density as described above.

However, in the latter two embodiments where contact-media accumulation tanks are provided, micro flocks made greater in density are accumulated or pooled on walls of the contact-media accumulation tanks 12, 15, by which there may be posed a technical difficulty in disturbing the flow of water to be treated 1.

In order to cope with the above situation, in a further embodiment, such a constitution is adopted that air is injected intermittently or continuously into a contact-media accumulation layer, thus making it possible to remove micro flocks pooled and accumulated on the contact-media accumulation layer. Thereby, the above technical difficulty can be solved.

In the latter three embodiments where the contact-media accumulation tanks 12, 15 are provided, and, in particular, in a still further embodiment, where superficial water-passage speed in a contact-media accumulation tank is 3.0 m/h or more and retention time is 1.5 minutes or more, it is possible to attain at the same time the reduction in diameter of micro flocks and reduction in number of micro flocks at a stage that a filtration step is completed. In particular, the micro flocks whose mean diameter is 3.0 μm or more can be greatly reduced in number, thus contributing to the reduction in turbidity of filtered water.

A yet further embodiment is such that a conventional system having a slow agitation step is adopted as a flocculation step, a $G_r$ value or a slow agitation intensity (a value expressed by the [Equation 2]

$$G_S = \sqrt{\frac{(CAv^3)}{2\gamma V}}$$

where an agitation coefficient is given as C, an area of agitation blade is given as A (m²), a peripheral speed of agitation blade is given as v (m/sec), a coefficient of kinetic viscosity is given as Y(m²/sec) and a volume of agitation tank (capacity) is given as V (m³)) is set to be 20 sec⁻¹ or more and a $T_r$ value or slow agitation time is set to be 5 minutes or more, by which existing flocks are brought into contact with micro flocks.

Figure 4:
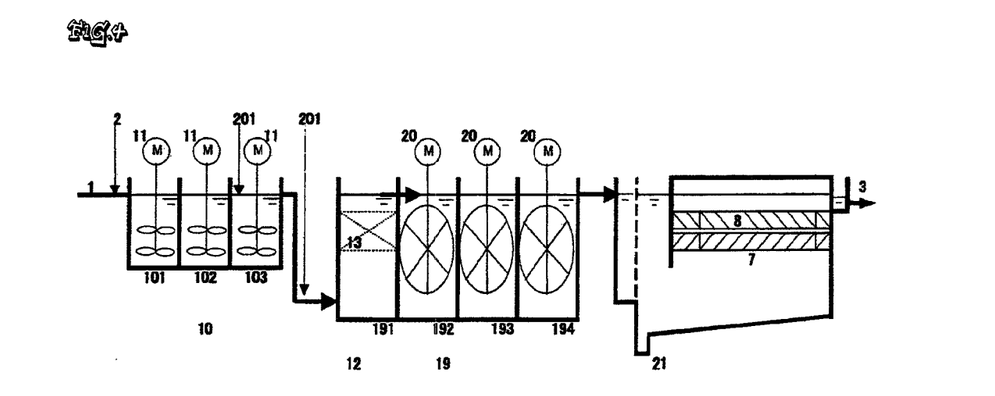
FIG. 4 is a block diagram showing an embodiment in which a slow agitation tank is adopted on the basis of a conventional system.

As a specific constitution, as shown in FIG. 4, after the rapid agitation tank 10 divided into three compartments 101, 102, 103, slow agitators 20 are mounted for flock formation respectively in three compartments 192, 193, 194 among four compartments 191, 192, 193, 194, thereby realizing flocculation at the three compartments 192, 193, 194, then, after passage through the last compartment 194, water to be treated flows into a sedimentation basin 21 having inclined equipment 8 and a clarified zone 7 to undergo filtration subsequently (it is noted that the first contact-media accumulation tank 12 is provided on the first compartment 191 but it is not an essential requirement to provide the contact-media accumulation tank concerned).

In a conventional system which adopts a slow agitator 20, a conventional technology has set the Gs value which is small, that is, approximately 20 sec⁻¹, on the basis of a remaining amount of coagulants and agglomerates which is greater than 4.0 or an STR value in the present invention. In the above-described conventional agglomeration process, while flocks at a flock forming tank 19 grow larger (become coarse) in a state of low density, they are lower in agitation intensity to reduce in collision frequency, thereby micro flocks which will not undergo sedimentation or separation but will remain are inevitably produced in a great amount.

In contrast, as described in a further embodiment, where a Gs value or slow agitation intensity and a Ts value or slow agitation time are set as above, micro flocks collide with each other with increased frequency and they are brought into contact with existing flocks efficiently to reduce the remaining amount of micro flocks whose diameter is 3.0 μm or less. Further, the micro flocks are agglomerated (coagulated) to those whose diameter is 3.0 μm or more, thereby contributing to the development of such a state that the micro flocks can be settled and separated.

A still further embodiment is such that, as a flocculation step, there is adopted a sludge blanket system for attaining flocculation by bringing a group of original flocks accumulated on a sludge blanket layer 6 with micro flocks, and the sludge blanket layer 6 is from 50 cm or more to 200 cm or less in height.

More specifically, as shown in FIG. 1 and FIG. 2, the micro flocks are flocculated inside a sludge blanket tank 5 having the sludge blanket layer 6. In the embodiments of the present invention, on the basis of the fact that the micro flocculation step has increased the diameter of micro flocks and reduced the number of micro flocks (in reality, there is often found a reduction in micro flocks whose diameter is 3.0 μm or less and an increase in micro flocks whose diameter is 3.0 μm or more due to this reduction), it is possible to reduce the capacity of the sludge blanket tank 5.

More specifically, in a conventional technology, since micro flocks flow into the sludge blanket tank 5 in a large number (in particular, the number of micro flocks whose diameter is 3.0 μm or less), usually, the sludge blanket layer 6 is required to be 200 cm to 300 cm in height. In contrast, the embodiment of claim 14 which is based on the embodiment of each of the above-described claims is able to effect flocculation by setting the height in a range of 50 cm to 200 cm.

Further, since the micro flocks arriving on the sludge blanket layer 6 are made finer in particle size and greater in density, thereby original flocks resulting from accumulation of the micro flocks can also be made finer in particle size and greater in density.

Still further, since the micro flocks remaining in sedimentation-treated water 3 are made finer in particle size and greater in density, it is possible to reduce the frequency of washing (the number of washings) in association with a reduction in the outflow of micro flocks remaining in filtered water whose diameter is 3.0 μm or more and prevent disturbed washing functions resulting from the clogging of a filtration basin. It is also possible to improve the concentration and dehydration of sludge produced from the original flocks which are made finer in particle size and greater in density.

Hereinafter, a description will be given to individual embodiments by referring to specific data.

First Embodiment

As shown in FIG. 1, under the conditions that there is adopted a rapid agitation tank 10 divided into three compartments 101, 102, 103 and a sedimentation basin 21, a G value which is an agitation intensity of the rapid agitation tank 10 is given as 1250 s$^{-1}$, a T value which is an agitation time is given as 7.3 minutes, and an injection rate of the first coagulant injection step is given as 18.9 mg/L, after the rapid agitation, injection rates of the second coagulant injection step, that is, 0, 9.44 and 18.9 mg/L are compared by referring to the presence or absence of inclined plates with a pitch of 10 mm mounted at two places.

The results are shown in Table 1 (where the upper numerical values indicate a case where the flock-forming inclined plate 8 is provided, while the lower numerical values indicate a case where no flock-forming inclined plate 8 is provided, and the lower table of Table 1 shows the data of individual items on the state of original flocks 24 hours after the treatment on the basis of each injection rate of PAC).

TABLE 1

| Injection rate of $PAC_B$ (mg/L) | 0.5–1.0 μm (Number of flocks/mL) | 1.0–3.0 μm (Number of flocks/mL) | 3.0–7.0 (Number of flocks/mL) | 7.0 or more (number of flocks/mL) | Turbidity (degree) | Ratio of turbidity |
|---|---|---|---|---|---|---|
| 0 | 22369 | 1742 | 355 | 77 | 0.040 | 1/5.3 |
|   | 20430 | 1954 | 808 | 703 | 0.211 |   |
| 9.44 | 11978 | 908 | 150 | 26 | 0.018 | 1/2.4 |
|   | 10261 | 725 | 236 | 135 | 0.044 |   |
| 18.9 | 6653 | 387 | 95 | 20 | 0.014 | 1/1.4 |
|   | 6640 | 338 | 139 | 46 | 0.020 |   |

| Injection rate of $PAC_B$ (mg/L) | Treatment time (h) | STR (—) | Volume concentration of flocks (%) | Concentration on dry solid basis (mg/L) | SDI value (mg/mL) |
|---|---|---|---|---|---|
| 0 | 24 | 1.18 | 20.2 | 2000 | 9.90 |
| 9.44 | 24 | 3.35 | 24.8 | 1624 | 6.55 |
| 18.9 | 24 | 5.60 | 27.0 | 1548 | 5.43 |

As apparent from the upper table of Table 1, the number of micro flocks whose diameter is 7.0 μm or more for no inclined plate provided is reduced from 703/mL to 135/mL and 45/mL, with an increase in the injection rate of an inorganic coagulant in the second coagulant injection step. The destruction of original flocks is solved and the number thereof is reduced accordingly, and the number of particles with a different diameter is similarly reduced to a greater extent. As apparent from the lower table, with an increased injection rate of an inorganic coagulant, an STR is increased from 1.18 to 3.35 and 5.60, while an SDI value indicating the concentration performance of original flocks (an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using 100 mL-capacity measuring cylinder) is reduced from 9.90 mg/mL to 6.55 mg/mL and 5.43 mg/mL.

As apparent from Table 1, the turbidity is 0.044 degrees where no flock-forming inclined plate 8 is provided to give a 9.44 mg/L injection rate of an inorganic coagulant in the second coagulant injection step, and the turbidity is 0.040 where no inorganic coagulant is injected in the second coagulant injection step but the inclined plate is provided.

Therefore, these values are substantially equal.

More specifically, it has been demonstrated that even if a second coagulant injection rate is zero, the flock-forming inclined plate 8 with a pitch of 10 mm is provided at two places, thus making it possible to obtain clear water which is similar to that obtained where the second coagulant injection rate is 9.4 mg/L.

It has been demonstrated that at the second coagulant injection rate of 18.9 mg/L, the turbidity of water to be treated after passage through the flock-forming inclined plate 8 at a ratio to that before passage is 1/1.4, which does not satisfy the basic requirement of the present invention, and where an injection amount of a coagulant is in excess of a predetermined amount, functions exhibited by the flock-forming inclined plate 8 are relatively reduced.

In the case where a turbidity passed through the flock-forming inclined plate 8 is provided as 0.014 at an injection rate of 18.9 mg/L, while the turbidity is 0.018 even at an injection rate of 9.44 mg/L, no great difference is found between them but also these values are better than the turbidity of 0.020 where the injection rate is 18.9 mg/L, with no flock-forming inclined plate 8 provided.

More specifically, it has been demonstrated that even where an injection rate is reduced by approximately 1/2 in the second coagulant injection step, micro flocks and suspended particles collide with each other due to turbulent currents associated with swirling currents in the flock-forming inclined plate 8, thereby accelerating flocculation sufficiently.

When phenomena of the turbidity given in Table 1 are observed, a method for injecting a coagulant in a flocculation step to increase an STR solves the destruction of flocks by making the flocks lower in density while made coarse, thereby attaining a reduced turbidity of sedimentation-treated water. With this result taken into account, the destruction of original flocks will be solved by increasing the STR after rapid agitation. However, since an SDI value which indicates the concentration performance of original flocks is reduced, it is suggested that the destruction of original flocks is involved in the original flocks which are made coarse and lower in density. As with a conventional method, this is not favorable for subsequent filtration treatment and sludge disposal. In contrast, the flock-forming inclined plate 8 is adopted, by which micro flocks whose diameter is 3.0 μm or more can be first separated at a high efficiency as shown in Table 1. Therefore, sedimentation-treated water is approximately equal in turbidity to a method for solving the destruction of flocks and there is realized a reduction in the number of particles whose diameter is 3.0 μm or less. As a result, it has been supported that sedimentation can be conducted correctly without injection of an inorganic coagulant in the second coagulant injection step.

As apparent from Table 1, an injection amount of the coagulant in the second coagulant injection step can be controlled by an STR at the beginning of the flocculation step. However, with consideration given to a relative relationship between the STR and the turbidity of sedimentation-treated water, it is also possible to control an injection amount in the second coagulant injection step on the basis of the turbidity of sedimentation-treated water.

Second Embodiment

As shown in FIG. 1 and FIG. 2, there is provided a rapid agitation tank 10 divided into three compartments, a contact-media accumulation tank is connected to the rapid agitation tank 10, then, G values or agitation intensities for a first compartment, a second compartment and a third compartment are given respectively as $1500\,s^-$, $1500\,s^{-1}$ and $1500\,s^{-1}$, T values or agitation time for the first compartment, the second compartment and the third compartment are given respectively as 0.96 minutes, 0.96 minutes and 2.93 minutes, a Gs value or an agitation intensity in a slow agitation tank is given as $25\,s^{-1}$, a $T_R$ value or agitation time is given as 28 minutes, an injection rate in the first coagulant injection step is given as 26.4 mg/L, and an injection rate in the second coagulant injection step is given as zero, thereby setting conditions of micro flocculation. Then, as shown in FIG. 3, a conventional system is adopted as a flocculation step and also a flock-forming inclined plate 8 is provided both in the vicinity of an inlet port of a sedimentation basin 21 into which water to be treated 1 flows and in the vicinity of an outlet port thereof from which clear water flows, the inclined plate 8 in the vicinity of the inlet port is set for the pitch to be 24 mm and the inclined plate 8 in the vicinity of the outlet port is changed in the pitch. The results are shown in Table 2.

As apparent from Table 2, the smaller the pitch of the flock-forming inclined plate 8, the smaller the turbidity of water to be treated 1 after passage at a ratio to that before passage, thereby demonstrating that on advancement into the flock-forming inclined plate 8, micro flocks and suspended particles collide with each other to form flocks, thus raising a probability that the flocks will settle in a sedimentation basin 21.

Where the pitch is 48 mm, the turbidity of water to be treated after passage at a ratio to that before passage is reduced approximately 1/1.3, which satisfies a fundamental requirement of the present invention or a ratio of 4/5 or less. However, the ratio is not necessarily reduced to a great extent.

A reason for the above-described result is that flocculation is substantially accelerated by the flock-forming inclined plate 8 with the pitch width of 24 mm provided in the vicinity of the inlet port (the above-described pitch width satisfies a numerical requirement of the pitch width of the flock-forming inclined plate set at a final stage of flocculation in the present invention).

In addition to the measurements given in Table 2, measurement was made for turbidity at a stage of passage through the third compartment of a flock forming tank 19 equipped with a slow agitator 20 (a third compartment of the slow agitation tank) 193, and the turbidity was 85.4. With consideration given to the fact that Table 2 shows the turbidity of 0.098 obtained where no flock-forming inclined plate 8 is provided in the vicinity of the outlet port, it has been demonstrated that the flock-forming inclined plate 8 provided in the vicinity of the inlet port contributes to a drastic reduction in turbidity.

INDUSTRIAL APPLICABILITY

The present invention is able to find uses in all industrial fields related to disposal of sewage and sludge by using inorganic coagulants.

What is claimed is:

1. A coagulation sedimentation process for water to be treated comprising:
   an inorganic coagulant injection step for injecting an inorganic coagulant into water to be treated,
   a micro flocculation step for mixing and agitating in a rapid agitation tank the water to be treated into which the inorganic coagulant has been injected to micro-flocculate in advance fine suspended particles in the water to be treated,
   a flocculation step including a step in which the micro flocks are further flocculated by being brought into contact with existing flocks in a sedimentation basin, and
   a sedimentation separation step for effecting the sedimentation and separation of the flocks in the sedimentation basin,

TABLE 2

| Mounting pitch (mm) | 0.5-1 (μm) | 1-3 (μm) | 3-7 (μm) | 7 or more (μm) | Turbidity (degree) | Turbidity of water to be treated after passage through inclined plate at a ratio to that before passage | STR |
|---|---|---|---|---|---|---|---|
| 11 | 14000 | 1066 | 146 | 35 | 0.041 | 1 to 2.4 | 1.09 |
| 24 | 15103 | 1151 | 235 | 36 | 0.046 | 1 to 2.1 | 1.09 |
| 48 | 15270 | 1328 | 517 | 116 | 0.075 | 1 to 1.3 | 1.11 |
| comparative example* | 14818 | 1643 | 569 | 228 | 0.098 | 1 | 1.11 |

*where no inclined plate 8 is provided in the vicinity of outlet port, that is, the inclined plate 8 is provided only in the vicinity of an inlet port.

wherein as a final stage of the flocculation step, a plurality of flock-forming inclined plate whose pitch width is from at least 5 mm to 50 mm or less is provided, and swirling and turbulent currents are created at a lower side end portion of the inclined plates, to accelerate flocculation, and the amount of inorganic coagulant used at a stage of the micro flocculation step is limited so that turbidity of the water to be treated after passage through the inclined plate at a ratio to that before passage is 4/5 or less.

2. The coagulation sedimentation process for water to be treated as set forth in claim 1, wherein in the micro flocculation step, the rapid agitation tank is divided into at least two compartments which are arranged in series so that water to be treated is adapted to move sequentially, and there are provided a first coagulant injection step for injecting an inorganic coagulant into at least a part of the water to be treated at a stage leading to a first compartment of the micro flocculation step and a second coagulant injection step for injecting an inorganic coagulant into at least a part of the water to be treated at a stage leading from a second compartment of the micro flocculation step to a flocculation step, thereby adjusting the injection amounts respectively in the first coagulant injection step and the second coagulant injection step.

3. The coagulation sedimentation process for water to be treated as set forth in claim 1, wherein, as an index for indicating a remaining amount of coagulants and agglomerates, an STR of water to be treated at a stage that the micro flocculation step is completed is 4.0 or lower by limiting the injection amount of the coagulant, where STR is Suction Time Ratio which is an index indicated by Ts/Tv where distilled water equal in temperature and volume with water to be treated is used to suck a same filter paper at a same suction level and where a suction time of the water to be treated is given as Ts and that of the distilled water is given as Tv.

4. The coagulation sedimentation process for water to be treated as set forth in claim 3, wherein, the STR of water to be treated at a stage that the micro flocculation step is completed is 2.5 or lower by limiting the injection amount of coagulant.

5. The coagulation sedimentation process for water to be treated as set forth in claim 1, wherein after such coagulation conditions are set that the number of particles remaining in sedimentation-treated water whose diameter is 3.0 μm or less is 100,000/mL or less at a stage that a micro flocculation step is completed, in one of the flocculation step and a stage prior to complete passage through the flock-forming inclined plates, flocculation is conducted under such coagulation conditions that one of an SDI value and an index indicating concentration performance of flocks defined by (an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using a 100 mL-capacity measuring cylinder) is at least 6 mg/mL by setting the extent of rapid agitation to be greater.

6. The coagulation sedimentation process for water to be treated as set forth in claim 5, wherein after such coagulation conditions are set that the number of particles remaining in sedimentation-treated water whose diameter is 3.0 μm or less is 40,000/mL or less at a stage that a micro flocculation step is completed, in one of the flocculation step and a stage prior to complete passage through the flock-forming inclined plate, flocculation is conducted under such coagulation conditions that one of an SDI value and an index indicating concentration performance of flocks defined by an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using a 100 mL-capacity measuring cylinder) is at least 6 mg/mL.

7. The coagulation sedimentation process for water to be treated as set forth in claim 1, wherein after one of a sludge blanket system and a system which uses agitation at a slow speed is adopted as a flocculation step, a plurality flock-forming inclined plates are provided only in the vicinity of an outlet port of a sedimentation basin from which clear water flows.

8. The coagulation sedimentation process for water to be treated as set forth in claim 1, wherein after a system which uses agitation at a slow speed is adopted as a flocculation step, flock-forming inclined plates are provided both in the vicinity of an inlet port of the sedimentation basin subsequent to a slow agitation tank into which water to be treated flows and in the vicinity of an outlet port thereof from which clear water flows.

9. The coagulation sedimentation process for water to be treated as set forth in claim 1, wherein as a rapid agitation intensity in each compartment of a micro flocculation step, a $G_R$ value is expressed by the equation $$G_R = \sqrt{\frac{(CAv^3)}{2\gamma V}}$$

where an agitation coefficient is given as C, an area of an agitation blade is given as A (m$^2$), a peripheral speed of the agitation blade is given as v (m/sec), a coefficient of kinetic viscosity is given as Y (m$^2$/sec) and a volume of the agitation tank (capacity) is given as V (m$^3$)) and $G_R$ is set to be at least 150 sec$^{-1}$, and, as rapid agitation time, a T value is set to be at least 3 minutes.

10. The coagulation sedimentation process for water to be treated as set forth in claim 1, wherein a vertical width of the flock-forming inclined plates is from at least 30 mm to 100 mm or less and a plurality of the inclined plates are provided at an interval of at least 20 mm to 200 mm or less in the vertical direction.

11. The coagulation sedimentation process for water to be treated as set forth in claim 1, wherein there are provided contact-media accumulation tanks in which a state for blocking the flow of micro flocks is formed between a rapid agitation step and the flocculation step to enable contact of micro flocks with other micro flocks and collision with each other, and water to be treated passes through contact-media accumulation tanks, thereby further accelerating micro flocculation.

12. The coagulation sedimentation process for water to be treated as set forth in claim 11, wherein a plurality of said contact-media accumulation tanks are provided.

13. The coagulation sedimentation process for water to be treated as set forth in claim 11, wherein air is injected one of intermittently and continuously into a contact-media accumulation layer, thus making it possible to remove micro flocks one of pooled and accumulated on a contact-media accumulation layer.

14. The coagulation sedimentation process for water to be treated as set forth in claim 11, wherein superficial water-passage speed in a contact-media accumulation tank is at least 3.0 m/h and retention time is at least 1.5 minutes.

15. The coagulation sedimentation process for water to be treated as set forth in claim 1, wherein any system is adopted as a flocculation step, and on slow agitation actions by said coagulation sedimentation process, a $G_S$ value of a slow agitation intensity $$G_S = \sqrt{\frac{(CAv^3)}{2\gamma V}}$$

where an agitation coefficient is given as C, an area of agitation blade is given as A (m$^2$), a peripheral speed of agitation blade is given as v (m/sec), a coefficient of kinetic viscosity is given as Y(m$^2$/sec) and a volume of agitation tank (capacity) is given as V (m$^3$)) is set to be at least 20 sec$^{-1}$ and a T value or slow agitation time is set to be at least 5 minutes, by which existing flocks are brought into contact with micro flocks.

16. The coagulation sedimentation process for water to be treated as set forth in claim 1, wherein a sludge blanket system is adopted as a flocculation step, and a sludge blanket layer for attaining flocculation by contact of a group of accumulated original flocks with micro flocks is from at least 50 cm to 200 cm or less in height.

17. The coagulation sedimentation process for water to be treated as set forth in claim 1, wherein after such coagulation conditions are set that the number of particles remaining in sedimentation-treated water whose diameter is 3.0 μm or less is 100,000/mL or less at a stage that a micro flocculation step is completed, in one of the flocculation step and a stage prior to complete passage through the flock-forming inclined plates, flocculation is conducted under such coagulation conditions that one of an SDI value and an index indicating concentration performance of flocks defined by an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using a 100 mL-capacity measuring cylinder) is at least 8 mg/mL.

18. The coagulation sedimentation process for water to be treated as set forth in claim 17, wherein after such coagulation conditions are set that the number of particles remaining in sedimentation-treated water whose diameter is 3.0 μm or less is 40,000/mL or less at a stage that a micro flocculation step is completed, in one of the flocculation step and a stage prior to complete passage through the flock-forming inclined plate, flocculation is conducted under such coagulation conditions that one of an SDI value and an index indicating concentration performance of flocks defined by an index value of sludge density calculated by an equation of dry-solid-based amount of flocks in samples (mg/{flock volume (mL)×the number of samples}) as a dry-solid-based amount (mg) contained per mL of flock volume obtained by dry-solid-based concentrations of the samples after measurement of the volume concentration of flocks subsequent to 30-minute sedimentation by using a 100 mL-capacity measuring cylinder) is at least 8 mg/mL.

* * * * *